(12) United States Patent
Cosman et al.

(10) Patent No.: US 6,707,948 B1
(45) Date of Patent: Mar. 16, 2004

(54) IMAGE COMPRESSION FOR MEMORY-CONSTRAINED DECODERS

(75) Inventors: Pamela Caren Cosman, La Jolla, VA (US); Kenneth Alan Zeger, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/192,796

(22) Filed: Nov. 16, 1998

Related U.S. Application Data

(60) Provisional application No. 60/066,056, filed on Nov. 17, 1997.

(51) Int. Cl.[7] .............................. G06K 9/36; H04N 1/41
(52) U.S. Cl. ........................ 382/240; 382/248; 358/426
(58) Field of Search ................................ 382/240, 248, 382/232, 128; 358/426; 375/240.11, 240.19, 240.18, 240.01

(56) References Cited

U.S. PATENT DOCUMENTS

| | | | | |
|---|---|---|---|---|
| 5,315,670 A | | 5/1994 | Shapiro | 382/240 |
| 5,321,776 A | | 6/1994 | Shapiro | 382/240 |
| 5,412,741 A | | 5/1995 | Shapiro | 382/232 |
| 5,563,960 A | | 10/1996 | Shapiro | 382/239 |
| 5,724,451 A | * | 3/1998 | Shin et al. | 382/240 |
| 5,867,602 A | * | 2/1999 | Zandi et al. | 382/248 |
| 5,966,465 A | * | 10/1999 | Keith et al. | 382/232 |
| 6,195,465 B1 | * | 2/2001 | Zandi et al. | 382/248 |

OTHER PUBLICATIONS

J. M. Shapiro, "Embedded Image Coding Using Zerotrees of Wavelet Coefficients", IEEE Transactions on Signal Processing, 41(12):3445–3462, Dec. 1993.

A. Said and W. A. Pearlman, "A New, Fast, and Efficient Image Codec Based on Set Partitioning in Hierarchial Trees", IEEE Transactions on Circuits and Systems for Video Technology, 6(3):243–250, Jun. 1996.

Zhigang Fan, "Unscreening Using A Hybrid Filtering Approach", Proceedings International Conference on Image Processing, p. 351–4, vol. 3, 1996.

* cited by examiner

*Primary Examiner*—Wenpeng Chen
(74) *Attorney, Agent, or Firm*—Greer, Burns & Crain, Ltd.

(57) ABSTRACT

Image data to be printed is compressed with an encoding algorithm, preferably a Teng and Neuhoff algorithm, or else a wavelet zerotree algorithm including the embedded zerotree wavelet (EZW) or set partitioning in hierarchical trees (SPIHT) algorithm at, preferably, a different number of levels of filtering decomposition for horizontal and vertical directions in the image, the number of decomposition levels in a horizontal spatial direction of the image being greater than the number of decomposition levels in the vertical spatial direction of the image. The spatially differentially compressed image data is preferably then re-ordered so that successive portions of the compressed data represent successive strip portions of the image, normally vertical strip portions. These strip portions are sequentially communicated to an image display device, normally a color printer, with economy of bandwidth. There the compressed image data portions are sequentially decompressed/decoded by use of but a modestly-sized decoder image data buffer memory, decompressed/decoded portions being used to sequentially print the image, vertical image strip portion by successive vertical image strip portion. For printers constrained in performance by image data transfer or decompression, the net effect is faster printing, typically 10 to 100 times faster, of, typically, high quality color images in color printers, particularly of the ink jet and laser types, that are less expensive to construct by up to 10% overall because of reduced requirement for image data buffer memory.

9 Claims, 3 Drawing Sheets

IMAGE COMPRESSION FOR MEMORY-CONSTRAINED DECODERS

REFERENCE TO RELATED PATENT APPLICATION

The present application is descended from, and claims benefit of priority of, U.S. provisional patent application serial No. 60/066,056 filed Nov. 17, 1997, for IMAGE COMPRESSION FOR MEMORY-CONSTRAINED DECODERS. The related provisional patent application is assigned to the same assignee as is the present patent application.

BACKGROUND OF THE INVENTION

1. Field of the Invention

The present invention generally concerns digital data compression and decompression, particularly the compression and decompression of digital data representing images, and still more particularly color images.

The present invention particularly concerns the compression and decompression of digital image, and color image, data in the computer and/or color printing, and/or in other transmission(s), of images so that (i) bandwidth between the computer and the printer (or other image recipient) may be conserved, while (ii) decompression of the compressed image is sequential, image side to image side (e.g., image top to image bottom), thus (iii) minimizing the memory requirement for an image data buffer in the printer (or other image recipient).

2. Description of the Prior Art

2.1 The Prior Art of Shapiro, of Pearlman, and of Teng and Neuhoff

The present invention will be seen to concern the compressing of digitized image data, particularly as may represent a color image. The disclosed technique of the invention will be seen to have the properties of (i) being efficient in the (typically different types of) memory (variously) required for each of compressing the image, storing the compressed image and decompressing the compressed image; (ii) permitting the printing of a high quality image, especially such as may be in color; and (iii) supporting a sequential decompression of the compressed image from one side of the image to the other—normally from the top of the image to the bottom. The technique is thus very suitable for applications such as printing images with inkjet or laser printers. Images transmitted in accordance with the present invention need not be printed. They can be, for example, transmitted over networks such as the Internet, displayed on video consoles in cars and on picture phones, and used in video conferencing—the main characteristic being that the images are sequentially decompressed, and are normally sequentially displayed in successive parts as decompression transpires.

In so functioning, the technique of the present invention may first be compared to the prior art apparatus and methods described in four (4) existing U.S. patents of Jerome Shapiro.

U.S. Pat. No. 5,315,670 to Jerome M. Shapiro for DIGITAL DATA COMPRESSION SYSTEM INCLUDING ZEROTREE COEFFICIENT CODING assigned to General Electric Company (Princeton, NJ) concerns a data processing system augmenting compression of non-zero values of significant coefficients by coding entries of a significance map independently of coding the values of significant non-zero coefficients. In the system a dedicated symbol represents a zerotree structure encompassing a related association of insignificant coefficients within the tree structure, thereby compactly representing each tree of insignificant coefficients.

The zerotree symbol represents that neither a root coefficient of the zerotree structure nor any descendant of the root coefficient has a magnitude greater than a given reference level. The zerotree structure is disclosed in the context of a pyramid-type image subband processor together with successive refinement quantization and entropy coding to facilitate data compression.

U.S. Pat. No. 5,321,776 to Shapiro for DATA COMPRESSION SYSTEM INCLUDING SUCCESSIVE APPROXIMATION QUANTIZER also assigned to General Electric Company concerns the same data processing system where the zerotree symbol represents that a coefficient is a root of a zerotree if, at a threshold T, the coefficient, and all of its descendants that have been found to be insignificant at larger thresholds, have magnitudes less than threshold T.

U.S. Pat. No. 5,412,741 to Shapiro for an APPARATUS AND METHOD FOR COMPRESSING INFORMATION assigned to David Sarnoff Research Center, Inc. (Princeton, NJ) concerns an apparatus that achieves high compression efficiency in a computationally efficient manner. A corresponding decoder apparatus, and methods, are also disclosed. The technique uses zerotree coding of wavelet coefficients in a much more efficient manner than previous techniques. The key is the dynamic generation of the list of coefficient indices to be scanned, whereby the dynamically generated list only contains coefficient indices for which a symbol must be encoded. This is claimed to be a dramatic improvement over the prior art in which a static list of coefficient indices is used and each coefficient must be individually checked to see whether (i) a symbol must be encoded, or (ii) it is completely predictable. Additionally, using dynamic list generation, the greater the compression of the signal, the less time it takes to perform the compression. Thus, using dynamic list generation, the computational burden is proportional to the size of the output compressed bit stream instead of being proportional to the size of the input signal or image.

Finally, U.S. Pat. No. 5,563,960 to Shapiro for an APPARATUS AND METHOD FOR EMPHASIZING A SELECTED REGION IN THE COMPRESSED REPRESENTATION OF AN IMAGE also assigned to David Sarnoff Research Center, Inc. concerns certain image analysis applications where it is desirable to compress the image while emphasizing a selected region of the image. The invention is a means for allocating more bits, and thus better quality in the decoded image, to the selected region at the expense of other regions of the image. This allows efficient compression of the image for storage or transmission with those regions deemed to be important preserved at high quality and other regions stored with minimal quality to preserve the context of the image.

The technique of the present invention may also be compared with a published paper of Said and Pearlman. See A. Said and W. A.

Pearlman; A new, fast, and efficient image codec based on set partitioning in hierarchical trees, IEEE Transactions on Circuits and Systems for Video Technology, 6(3):243–250, June 1996.

Finally, the technique of the present invention may be compared with a published paper of Teng and Neuhoff of the University of Michigan [hereinafter "Teng and Neuhoff"] See Chia-Yuan Teng and Dave L. Neuhoff; Quadtree-guided wavelet image coding, Proceedings DCC'96 (Data Compression Conference 1996, Snowbird, Utah, USA, Mar. 31–Apr. 3, 1996.) pp. 406–15.

In the quadtree-guided wavelet compression technique of Teng and Neuhoff only a single level of wavelet decomposition is used; thus it has only 4 subbands. The quantization and encoding of the wavelet coefficients proceeds as follows. The low—low band is divided into blocks of size k by k (typically k is 8 or 16) which are processed in raster scan order. For each block, the lower right corner (called the foot) is predicted from the pixel above the block in the same column, and to the left of the block in the same row. The prediction error is quantized and added to the prediction. Using this foot value, as well as the reconstructed values of neighboring pixels from previously encoded adjacent blocks, the rest of the pixels are predicted using linear interpolation. A quality test then checks how well the interpolation approximates the real pixel values. If the block passes the test, the quantized prediction error for the foot is transmitted using a variable length code. If not, the block is split into four sub blocks (a quadtree subdivision), and the same procedure is repeated for those. Coefficients in the high frequency bands are scalar quantized and run-length encoded in a manner that depends on how many times the corresponding coefficients in the low—low band were subdivided in the quadtree subdivision.

The present invention will be seen to involve the use of (i) a wavelet hybrid-filtering scheme and (ii) a line-by-line wavelet decoding technique. After the invention has been taught, the patents of Shapiro, and the papers of (i) Said and Pearlman, and of (ii) Teng and Neuhoff, will be re-visited in order that the present invention may be contrasted with this prior art.

U.S. Pat. No. 5,710,835 to Bradley for STORAGE AND RETRIEVAL OF LARGE DIGITAL IMAGES—assigned to the same assignee as is the present invention (The Regents of the University of California, Office of Technology Transfer, Alameda, Calif.)—concerns image compression and viewing. The methods of the invention involve (1) performing DWT-based compression on a large digital image with a computer system possessing a two-level system of memory and (2) selectively viewing areas of the image from its compressed representation at multiple resolutions and, if desired, in a client-server environment. The compression of a large digital image I(x,y) is accomplished by first defining a plurality of discrete tile image data subsets $T_{ij}(x,y)$ that, upon superposition, form the complete set of image data I(x,y). A seamless wavelet-based compression process is effected on I(x,y) that is comprised of successively inputting the tiles $T_{ij}(x,y)$ in a selected sequence to a DWT routine, and storing the resulting DWT coefficients in a first primary memory. These coefficients are periodically compressed and transferred to a secondary memory to maintain sufficient memory in the primary memory for data processing. The sequence of DWT operations on the tiles $T_{ij}(x,y)$ effectively calculates a seamless DWT of I(x,y). Data retrieval consists of specifying a resolution and a region of I(x,y) for display. The subset of stored DWT coefficients corresponding to each requested scene is determined and then decompressed for input to an inverse DWT, the output of which forms the image display.

The repeated process whereby image views are specified may take the form of an interaction with a computer pointing device on an image display from a previous retrieval.

When the present invention is later understood, it may beneficially be compared to U.S. Pat. No. 5,710,835 to Bradley [the "Bradley patent"]. In general the Bradley patent gives a way of retrieving portions of a wavelet coded image in a memory efficient manner. However it does not specifically consider full horizontal strips of the image and thus is not as efficient as the present invention will prove to be in that case—even though Bradley can handle that case.

There will seen to be still other differences between the present invention and the methods of the Bradley patent. First, as is manifest at column 1, lines 32–40, of the Bradley patent, the purpose of his method is (primarily) for viewing large image on screens, and not (primarily) for printing, as the present invention will be seen to be. The object of the present invention will be seen to be to reconstruct an entire image in a "sliding window style" from top to bottom. Bradley's objects are to view one or more pieces of the image. Bradley incurs an amount of overhead memory with each piece of the image viewed. The present invention will be seen to avoid the overhead as the memory devoted to each strip is exploited again in order to decode the next strip.

At column 3, lines 1–2, of the Bradley patent, data retrieval specifies different viewing resolutions. The present invention will be seen not to so function.

At column 6, lines 6–11, of the Bradley patent a routine using "tile dependent boundary conditions" is taught. The technique of the present invention will be seen to be specifically and specially tailored to horizontal strips, and will thus handle the boundary conditions differently.

At column 7, lines 27–30, the Bradley patent teaches storing a description of the tile (i.e. the shape of the region being coded) and a pointer to the pixel values. The present invention does not require any memory for this purpose because it can be deduced from the shapes used (i.e. the present invention will be seen to use horizontal strips from the far left end to the far right end—an innovation that Bradley did not think of or mention).

At column 7, lines 43–45, of the Bradley patent a wavelet transform is taught that yields more coefficients than the original image. The wavelet transform of the present invention does not.

It is a one-to-one mapping that preserves the amount of data.

At column 10, lines 58–59, the Bradley patent states that "[t]he invention is primarily intended for use in an interactive application". The present invention, primarily intended for printers, can also be used for interactive applications.

At column 13, lines 16–18, Bradley periodically compresses certain "sums" (numerical values) and sends them to a secondary memory in order to free up space. The present invention will be seen not to require this.

However, and despite these differences and others, the Bradley patent, in showing area-based image data compression, is close prior art to the present invention.

2.2 Desired Improvements to Image Compression Systems, Especially as Regards the Memory Usage of Wavelet-based Algorithms, Particularly Embedded Zerotree Wavelet (EZW) Coding, and Set Partitioning in Hierarchical Trees (SPIHT)

Consider an image compression system in which the decoder is constrained to have limited memory storage. For example, when a computer (e.g., a PC) sends an image to a printer to be printed, the printer may be unable to store the entire image at one time.

This is usually due to limited electronic memory (i.e. RAM) in the printer, in order to reduce manufacturing costs. A printer might typically be able to buffer only a small number of horizontally scanned image lines at one time. For example, some low-cost printers can only store on the order of 50–100 rows of an image at one time. However, the total number of rows of pixels in an image typically falls in the range of 256–2048. Many PCs today simply transmit to the printer one row at a time in uncompressed format (24 bits per pixel for color). The printer only needs to store one row at a time in such a case.

In certain low-cost computer systems, the transmission line between a computer and a printer can only support a relatively slow transmission rate, typically around 100 kbits/sec. This would impose, for example, about 1 minute of delay time to transmit a 512×512 color image. This motivates the need for data compression that first compresses a digitized image at the computer, and then transmits the compressed version of the image to the printer, and finally decompresses the image at the printer, which in turn prints the image.

There are many good image compression systems in existence today. The best of these typically require a compressed image to be fully decompressed at the printer before any printing of the image can begin. This exceeds the limited available memory in many printers. Thus, an important problem is to find good image compression algorithms which can be decompressed in pieces, from the top of an image to the bottom (i.e., as the paper exits the printer), so that incremental printing can be achieved with limited memory usage. With certain compression algorithms, this constraint is already met. For example, in baseline sequential JPEG (part of the international standard for still-image compression), the image is processed in blocks of 8×8 pixels. The blocks are processed in raster-scan order, so the decoder (at the printer) needs to buffer only a single strip of width 8 at any one time. After printing those 8 lines, the decoder can flush them out of memory and work on the next strip.

However, many wavelet-based algorithms outperform the JPEG technique by considerable margins, both quantitatively and subjectively. The most prominent of these algorithms is due to Shapiro. See the patents of Shapiro discussed in section 2.1 above. See also J. M. Shapiro, Embedded image coding using zerotrees of wavelet coefficients, IEEE Transactions on Signal Processing, 41(12):3445–3462, December 1993. This algorithm was later refined by Said and Pearlman. See A. Said and W. A. Pearlman, op, cit.

The Shapiro technique is known as Embedded Zerotree Wavelet (EZW) coding, and the refinement due to Said and Pearlman is known as Set Partitioning in Hierarchical Trees (SPIHT). These acronyms are further used in the specification of the present invention. Wavelet algorithms such as EZW and SPIHT generally require a complete image to be reconstructed before any particular spatial location in an image can be effectively printed by a printer. This requirement is often infeasible for printing, when memory constraints exist. The same memory constraint problem arises with algorithms based on full-frame Discrete Cosine Transforms (DCT). The present invention overcomes this memory problem for wavelet-based compression algorithms such as EZW and SPIHT.

SUMMARY OF THE INVENTION

The present invention concerns compressing (and decompressing) digital image data, particularly for transmitting (typically color) images, particularly to (color) inkjet and laser printers. As well as being transmitted for printing, images compressed in accordance with the present invention can be transmitted and displayed, for example., over networks such as the Internet for display on client computers, by radio over the airwaves for display on video consoles in cars and on picture phones, and over telephone lines for use in video conferencing. The main characteristic of image compression/decompression in accordance with the present invention is that images (i) are sequentially decompressed by wavelet based image encoding, and (ii) are normally sequentially displayed in successive parts as decompression transpires. Although it has heretofore been known to compress, and to decompress, images sequentially, and in parts, it has not been possible to do so by use of highly efficient and desirable wavelet encoding.

The method and system of the invention typically provides a compression ratio of up to approximately one hundred to one (100:1); retains very high image quality; is of low computational complexity; is conservative of bandwidth between a computer and a printer; and uses a very limited amount of electronic memory for image decompression in the printer. The overall effect is to provide a low-cost avenue for speeding up the printing (or other piecewise transmission) of images, particularly as may be in color, on (color) printers, especially of the ink-jet and (color) laser types.

The present invention in particular contemplates two improvements to the normal process of 1) performing a Wavelet Transform (a "WT") on digital image data; 2) compressively encoding the Wavelet Transform (WT) data by application of a wavelet-based encoding algorithm such as, notably, the algorithm of Teng and Neuhoff, or the Embedded Zerotree Wavelet (EZW) coding of Shapiro, or the refinement thereof due to Said and Pearlman which is known as Set Partitioning in Hierarchical Trees (SPIHT); and 3) transmitting the compressively encoded digital image data to an image generator (e.g., a printer) where it is 4) decompressed and displayed (or printed), normally piecewise sequentially.

1. Reordering of EZW- or SPIHT-encoded/compressed Image Data

The first improvement is to add a new step, a step 2a) as it were. In this step the EZW- or the SPIHT-encoded image data is re-ordered. It is this re-ordered data that is then 3) transmitted as a (re-ordered) bitstream to the image generator, or printer.

The purpose of the re-ordering is to compress, transmit, and decompress the lines (or groups of, say, eight lines) of a printable image (i) sequentially (ii) at top quality in order that the image may be printed out top to bottom (by lines, or by groups of lines). By this sequential, top-to-bottom, top-quality printing of an image much (i) net printing time, and (ii) printer decoder memory, may both be saved.

To understand that the "reordering" of the EZW- or SPIHT-encoded image data is not merely a parsing of the image, so as to transmit a first few lines followed by a next few lines, it is necessary to understand how the EZW and SPIHT algorithms work. First, these algorithms are typically used on large images that are some hundreds of pixels or more in each direction. They are so used just because these are the common sizes of digitized images, and also because, if the image is small, say only of size 32×32, then but little net savings of bits can be obtained from bothering with compression at all. Should EZW or SPIHT be used to do compression on, for example, a small 32×32 size image (as would actually require a trivial modification to SPIHT even to make it work on an image that small), then the image quality that would be obtained for a given compression ratio for the small image would not be as good as the quality that would be obtained at the same compression ratio for a big image, since the algorithm would be less efficient. Therefore, it is unsatisfactory to transmit successive sub-images of, say, eight horizontal rows each image.

Second, the (un-reordered, normally derived) image data compressed by the EZW or SPIHT algorithm is not successively decompressed over time from one region of the image to another—and particularly not from a top region of the image to a bottom region of the image—but is rather progressively decompressed so as to render the entire area of the image with increasing fidelity. An EZW- or an SPIHT-compressed image does not have to be communicated in its entirety before it can commence to be decompressed. Using the EZW or SPIHT algorithms, the decoder can begin decompressing the image right away when it gets just a few dozen bits, or a few hundred bits. But, what the decoder obtains at that point is not the top few lines of the image. Instead, the decoder obtains a coarse-resolution, poor quality version of the entire image. As more bits arrive, the decoder improves the quality over the whole image. So the top few lines (just like all the other lines) are not regenerated at highest quality, suitable to be printed, until the entire bit stream has been communicated.

Therefore, EZW or SPIHT encoding and decoding is progressive; the decoding progressively renders a quality improvement over the entire image field. This type of image encoding/decoding is useful when people are receiving a compressed image and are trying to view it on a monitor. While they are waiting for the whole image to arrive, they still get to look at some low quality full-frame version on their monitor. This type of progressive image encoding decoding is common on the Internet.

That is distinctly not what is required for printing (and certain other forms of image transmission such as, for example, the display of maps in cars). For printing it is not useful to initially decode the full-frame image at low quality. Instead, just the top few lines are wanted at highest quality, and then the next few lines, and so on, top-to-bottom within the image.

Accordingly, the first improvement of the present invention is to break apart, and to reorder, the EZW- or SPIHT-encoded (compressed) image data, transmitting data sufficient to first print a first group of lines first (typically eight such lines), and printing this (typically eight) first group of lines even while a second group of lines is being transmitted, then printing this second group of lines while a third group of lines is being transmitted, and so on. Clearly the overlap between printing (or displaying) and transmission makes that the transmission delay is not so onerous, nor is the memory requirement of the printer as large, as heretofore.

2. Filtering With a Wavelet Transform (WT) Where the Number of Decomposition Levels in the Vertical Direction is Less Than the Number of Decomposition Levels in the Horizontal Direction, and/or (ii) the Filter Lengths Employed in the Vertical Direction are Shorter Than Those Used in the Horizontal Direction Alas, although the image transmitted is highly compressed (as is a function of the excellence of both (i) wavelet-based encoding and (ii) zerotree compression algorithms—neither of which was invented by the present inventors), and may be quickly sequentially decoded in a line-by-line fashion in but a modestly sized decoder memory, and stepwise printed line-by-line top-to-bottom in a printer, the first improvement of the present invention taken alone does not represent ultimate image compression that can be realized.

The second improvement of the present invention deals with the filtering employed in the Wavelet Transform (a "WT"). This filtering is primarily characterized both by the number of levels of decomposition, and by the length of the filters used. The second improvement of the present invention is this: the number of decomposition levels, as well as the length of the filters, need not be, and, indeed, should not be, the same for (i) the horizontal and (ii) the vertical directions in the encoding (compressing) of digital image data that is to be printed. In particular, the number of decomposition levels in the vertical direction may beneficially be less than the number of decomposition levels in the horizontal direction, and the filter lengths employed in the vertical direction may beneficially be shorter than the ones used in the horizontal direction. Additionally, different filter lengths can be used at different levels of the decomposition, so that, for example, the vertical and horizontal directions may use filters of equal length for the first few levels of decomposition, and one may switch to using shorter filters for the vertical direction alone for the remaining levels of decomposition.

A shorthand way to regard this second improvement of the present invention is as follows. Let B represent a short filter such as the Haar wavelet filter of length 2. Let C represent a longer filter such as the Daubechies wavelet filter of length 8.

The filtering employed in a traditional wavelet/subband coding (compression) approach can be expressed, for example, as WT(6C,6C) where the first 6C indicates that the horizontal direction is getting filtered with the length-8 filter for 6 decomposition levels, and the second 6C indicates that the vertical direction is getting filtered with the length-8 filter for 6 decomposition levels. A less complex traditional filtering could be indicated by WT(4B,4B) where both directions get the same short filter and smaller number of decomposition levels. In the prior art, filtering expressed this way would always be of the form WT(h,v) where h=v; the horizontal and vertical directions are treated in like manner.

In accordance with the present invention, filters are employed where h and v differ in a number of ways. For example, WT(6C,6B) means that the vertical direction uses a shorter filter. WT(6C,4C) means that the vertical direction uses fewer levels of decomposition, but the same filter length. WT(6C,3C+3B) means that the vertical direction uses 3 levels of decomposition with the longer filter followed by 3 with the shorter filter; the horizontal direction uses the same total number of decomposition levels, but only with the longer filter. A final example is WT(6C,2C+3B) where the vertical direction, differs both in the filter lengths and in the total number of decomposition levels.

The benefit so realized by reducing (i) levels of decomposition and/or (ii) filter length, is that, especially for printed images, the amount of decoder memory is reduced while the quality of the decompressed printed image at a given bit rate does not suffer appreciable deterioration.

The aggregate effect of both improvements depends upon the operational computer image processing and printing (or color printing) environment in which the improvements are deployed. Not all printers are limited in their printing speed by their internal page image decoding operations, nor by the speed of their receipt of data from a computer, but are instead substantially mechanically limited in their speed of printing. Future computer I/O peripheral channels and busses, such as the fiber optical channel, may make it tenable to communicate voluminous image data with less, or no, compression. However, at the present time, some color ink jet printers (i) are incurring a significant proportion of their overall cost; of manufacture in their requirement for (typically semiconductor) memory, and, with common use of an inexpensive industry-standard "serial" or "parallel" I/O interface, (ii) are devoting a significant portion of the overall printing time in receiving and interpreting image data. The present invention easily permits that a printer constructed at less expense than heretofore, and by use of the same inexpensive and unimproved channel interface as heretofore, may receive, decode and print image data at equal quality at printing speeds about twice as fast as heretofore.

3. Re-ordering Wavelet-encoded Image Data

Therefore, in one of its aspects the present invention will be recognized to be embodied in an improvement to a stepwise method of (i) wavelet-encoding an image of finite horizontal and vertical extent into encoded data representative of the image, (ii) communicating the wavelet-encoded image data to an image generator, (iii) decoding the wavelet-encoded image data in the image generator, and (iv) generating the image from the decoded image data.

The improvement—between the steps of the (i) wavelet-encoding and the (ii) communicating—consists of re-ordering of the wavelet-encoded image data so that the (ii) communicating is of successive portions of the wavelet-encoded image data representing successive vertical portions of the image, so that the (iii) decoding is of these successively communicated portions; and so that the (iv) image generating is of successive portions of the image from top to bottom.

The (iii) decoding of the re-ordered image data portions, and the (iv) image generating of the image portions associated therewith, may thus be beneficially time-overlapped, certain vertical portions of the image being generated even before later image portions are communicated. Moreover, this entire process ensues even while highly efficient and effective wavelet encoding is employed.

The (i) wavelet-encoding is preferably with (a) the Teng and Neuhoff algorithm, or (b) an embedded zerotree algorithm. If with (b) an embedded zerotree algorithm, it is more preferably with the Embedded Zerotree Wavelet, EZW, of the Set Partitioning in Hierarchical Trees, SPIHT, algorithms. The re-ordering would then consist of rearranging the order of an EZW or a SPIHT bitstream that is an object of the communicating.

More generally, the re-ordering preferably consists of a line-by-line reordering of the wavelet coding by determining each of (i) the first minimum set of wavelet coefficients that must be received by the generator in order to generate one single portion of the image, (ii) a next minimum set of additional wavelet coefficients that must be communicated so that a next successive portion of the image can be printed, and (2) how much of the current encoded data can be expunged from a memory within the image generator.

The re-ordering may alternatively be characterized as a sliding window in the spatial domain of the wavelet-encoded image, in which sliding window (i) wavelet coefficients enter the window, (ii) are used for a few rounds of inverse filtering to permit the generating of a few successive vertical portions of the image, and then (iii) exit the window.

In accordance with the second aspect of the invention, the method preferably still further includes, at a time before the (i) wavelet-encoding, filtering the image data with a mathematical filter applied in both horizontal and vertical spatial directions of the image with a different number of levels of decomposition in each direction and/or filtering the image data with a mathematical filter having a different length in each of the horizontal and vertical spatial directions.

4. Spatially Differentially Filtering Image Data

In another of its aspects the present invention will be recognized to be embodied in an improvement to a method of (i) filtering digitized image data of an image having finite horizontal and vertical dimensions to produce filtered data representative of the image, (ii) encoding the filtered image data into encoded data representative of the image, (iii) communicating the encoded image data to an image generator, (iv) decoding the encoded image data in the image generator, and (v) generating the image from the decoded image data.

The improvement is to filter with (i) a filtering algorithm applied in both horizontal and vertical spatial directions of the image with a different number of levels of decomposition in each direction and/or with (ii) a filter having a different length in each of the horizontal and vertical spatial directions.

When a different number of decomposition levels are used, then the number of decomposition levels in the horizontal spatial direction is normally greater than the number of decomposition levels in the vertical spatial direction. When a differential filter length is used, then the length of the filter in the horizontal spatial direction is normally greater than the length of the filter in the vertical spatial direction. (The opposite can be true: the number of decomposition levels can be greater in the vertical than the horizontal spatial direction; the length of the differential filter can be longer in the vertical spatial direction than in the horizontal. Such would be the case for, by way of example, a printer that prints sideways, as many of 11"×17" capacity do when printing 1½"×11" (e.g., the Hewlett Packard Model 4V)).

This second aspect of the present invention may beneficially be combined with the first aspect. Namely, a re-ordering of the encoded image data may transpire so that the (iii) communicating is of successive portions of the encoded image data representing successive vertical portions of the image, so that the (iv) decoding is of these successively communicated portions, and so that the (v) image generating is of successive portions of the image from image top to image bottom.

The simultaneous (i) communication bandwidth conservation, and (ii) decoder memory economy, of the present invention are becoming even more important as high-color-resolution color images—typically represented by up to twenty-four (24) bits per pixel—are rendered at ever higher resolutions. Every doubling of resolution in a linear direction multiplies the image data by a factor of four (×4); motivating ever more, and better, (i) compression and (ii) time management of the data compression, communication, and decompression processes.

These and other aspects and attributes of the present invention will become increasingly clear upon reference to the following drawings and accompanying specification.

DESCRIPTION OF THE PREFERRED EMBODIMENT

Figure 1:
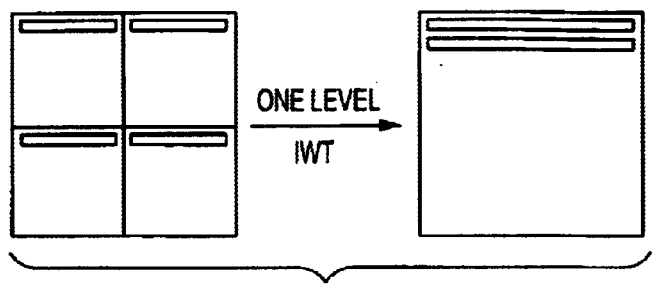
FIG. 1 is a diagrammatic view of the wavelet coefficients from a 1-level decomposition required to reconstruct the top row of an image with a 2-tap filter.

The present invention is based on two separate operations, which are called "line-by-line wavelet coding" and "hybrid filtering". Each is described in turn below.

1. Line-by-line Wavelet Coding

The present invention may usefully be described in terms of the improvement it accords to embedded zerotree algorithms such as the EZW and SPIHT algorithms, which are currently among the most powerful general-purpose data compression algorithms in existence. In fact, the technique of the present invention is not dependent upon using EZW nor SPIHT for encoding the wavelet coefficients, and can be applied to other quantization techniques as well. However, as stated, the technique of the present invention is usefully described in terms of the EZW and SPIHT algorithms for ease of understanding.

Any and all schemes for improving image compression/decompression will desirably retain the full performance (or nearly the full performance) of the image compression algorithm(s) employed. For example, if embedded zerotree algorithms (such as, for example, the EZW and SPIHT algorithms) are used for image compression/decompression, then the improvements will desirably not interfere with these algorithms, and their performance. One desirable improvement is to buffer only a small fraction of the image data at the image data decoder, thereby saving the cost of a full-image buffer memory. One obvious approach to so saving buffer memory in the decoding process is to divide the image into horizontal strips, each containing a small number of rows from the image, and then to compress each strip independently using an EZW-type algorithm on the rectangular sub-images. This technique, however, yields much poorer compression performance compared to using the original full image as the input to the compression algorithm.

One primary idea of the present invention is to rearrange the order of the EZW or SPIHT transmitted bitstream. EZW and SPIHT have the interesting feature that they are bit progressive—that is, successively higher quality reproductions of the image can be incrementally made as the bits arrive. While this feature can be very useful for certain applications, it is not needed in a printing application where only a single pass of printing can occur. In fact, the present invention does not retain the progressive nature (which is not needed) of the EZW or SPIHT compression algorithms, but does retain the overall quality with almost the exact same predetermined bit rate.

The basic idea of "line-by-line wavelet coding" can be stated as follows. If it is desired to print out one single horizontal line of an image at the decoder, it is important to determine the minimum set of wavelet coefficients that must be received by the decoder in order to print out one single row. After the printer has received that minimal set, and used it to print out one row, then the following two issues must be addressed: (1) the minimum set of additional wavelet coefficients that must be transmitted by the encoder so that the next row can be printed; and (2) how much of the current set of data can be expunged from memory. The second issue determined if there are any coefficients which were used to print out the first row which will never again be needed to print out any of the future rows. By receiving the minimal additional set of coefficients from the encoder, and by purging from memory any coefficients which can be purged, the minimal set of coefficients for the second row is generated. The same line of reasoning is followed for all remaining rows in order to print the image. Thus, at any given time, only the minimal number of lines required to print the upcoming row are buffered in the decoder's memory. For some rows, the number of additional coefficients sent by the PC may be zero. That is, depending on the filtering and which row is to be printed, the decoder may require no additional coefficients and can print out several rows at once. Similarly, the purging which takes place after a given row of printing might be zero.

Thus the basic property of wavelet coefficients that is exploited in the present invention is the following: even though a full-image wavelet transform is used to obtain the wavelet coefficients array, only a small subset of the wavelet coefficients are required in the inverse transform to obtain any given output row. Nearly the full performance of EZW and SPIHT zerotree wavelet coders can be retained while buffering only small subsets of the coefficients at the decoder. The encoder can begin, for example, by encoding the entire input image to the desired rate using the EZW algorithm. At this point, rather than transmit the sequence of symbols in the order produced by the EZW encoder, the disclosed encoder instead transmits the symbols in a "line-by-line wavelet coding" order. That is the order which allows the first row to be decoded, followed by the coefficients required to decode the 2nd row, etc.

As discussed in the Background of the Invention section, the quadtree-guided wavelet compression technique of Teng and Teng and Neuhoff uses only a single level of wavelet decomposition, thus it has only 4 subbands.

An example is now given. Suppose the subband decomposition operation consists only of one level of decomposition using the well-known Haar 2-tap filters. The coefficients required in order to reconstruct the top row of the original image are shown in FIG. 1. The decoder performs an inverse wavelet transform (IWT) operation to reconstruct the top, and the second, row of pixels using only a single line of coefficients from each of the four bands. Suppose instead the subband decomposition consisted of one level of decomposition with the well-known Daubechies 4-tap filters. Then two rows of coefficients would be required from each of the 4 subbands in order to reconstruct the top row of the output image.

Suppose an image is of size 512×512. In the case of a 4-tap filter, in order to print out a single row of 512 pixels, a total of 4×512=2048 coefficients must be received. Subsequently, to print out the second row, no additional coefficients are needed, nor can any of the current ones be purged. To print out the third row, one line from each of the 4 subbands can be purged, and a new line from the encoder from each of the 4 subbands must be received.

The memory usage thus remains constant. This effectively implements a "sliding window" in the spatial domain, in which wavelet coefficients enter the window, are used for a few rounds of inverse filtering to print out a few rows, and then exit the window.

This "sliding window" for wavelet coefficients is the core idea of the "line-by-line wavelet coding" of the present invention.

2. Header Information

In addition to reordering the output bitstream, the present invention may optionally accommodate the transmission of a small amount of header information at the start of the image and before each row. The most preferred, Teng and Neuhoff, algorithm requires no such header information, the encoder and decoder agreeing in advance upon a convention for sending the wavelet coefficients.

For those quantization schemes that are not self-parsing, and where header information is required to permit the decoder to parse out the sequence of minimal sets, then, in accordance with the present invention, bit streams corresponding to the succession of "minimal sets" of coefficients for the successive rows are made to arrive at the decoder in one continuous stream. The decoder needs to know where one set ends and the next one begins. This is realized by transmitting, at the start of each set, a single number that informs the decoder how many bits will be transmitted for that particular set (row).

This overhead is small, but it turns out that in fact it is not needed, as there is a more compact way for the decoder to learn this information. The encoder transmits one single header, at the beginning of the entire image, which describes the threshold $T_n$ and the coordinates (x,y) of the coefficient at which the encoding of the original algorithm (not re-ordered) terminates. The decoder then evaluates, as it decodes each row in the re-ordered bit stream, whether the bits received so far correspond to a threshold of $T_n$, and, if they do, whether the coordinates correspond to a position that exceeds (x,y). If they do, then the decoder knows that the data now corresponds to the next row.

In the present invention an additional piece of header information that may be useful for each minimal set is described. Instead of starting the encoding of each set with the same global threshold, the decoder is informed which initial threshold is to be used for the current set. In Shapiro's algorithm, the thresholds are integer powers of 2. The starting threshold is the largest power of 2 which is still smaller than the largest coefficient (in absolute value) occurring in the wavelet domain. Suppose that the initial threshold value is $1024=2^{10}$. In Shapiro's algorithm, there are only 10 other thresholds possible, ranging from 20 up to $2^9$. If a particular set has no coefficient larger than 1024, for example, but does have a coefficient larer than 512, then that set can be initialized with a threshold of 512. Since there are only 10 possible other thresholds, it takes only 4 bits of header information to convey which threshold is being used for the set. Since there are 64 coefficients in the lowest band, bits are saved by not having to specify 64 times the zerotree root symbol.

Since Shapiro's algorithm uses adaptive entropy coding, the number of bits required to send the zerotree root symbol 64 times in a row is not nearly as large as it would be without entropy coding. However, the number of transmitted bits can still be reduced by sending the tiny header information instead. Furthermore, if the decoder is computationally limited in addition to being memory constrained, then entropy coding could be impractical. If so, using appropriate initial thresholds for each strip is more advantageous.

As a further refinement on this idea, the algorithm is permitted to use thresholds which are not powers of 2. Let the global starting threshold used in the Shapiro algorithm be denoted by M. In this case, $\log_2(M)$ bits can specify the starting threshold for a strip if any integer up to M is allowed.

3. Filters and Decomposition Levels

In the example given above, where one level of decomposition with 4-tap filters was employed, the number of wavelet coefficients (i.e. 2048) in the window at any one time exceeded the number of pixels in a row (512) by the amount $1536=3\times512$ which acts as a "penalty factor" associated with the fact that a 4-tap filter is being used. If the Haar 2-tap filter is used instead, only 1024 wavelet coefficients would need to be buffered, which would exceed the number of pixels by only 512.

Figure 2:
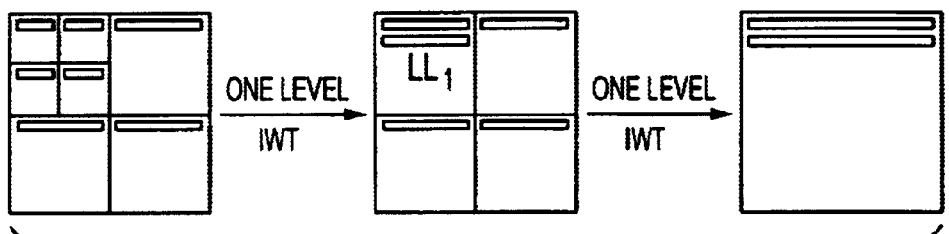
FIG. 2 is a diagrammatic view of the wavelet coefficients from a 2-level decomposition required to reconstruct the top row, with a 2-tap filter.

The method of bitstream re-ordering associated with "line-by-line wavelet coding" readily extends to filters of longer lengths, although more decoder memory may be needed. There is an increasing "penalty factor" in the memory usage as filters of longer lengths are used. Consider a decomposition with two levels, as depicted in FIG. 2. One row from each of the four small subbands can be inverse transformed to obtain the first two rows of the low—low, or LL, band of FIG. 2. If more levels of decomposition are used, the buffering requirements of the decoder are increased.

Figure 3:
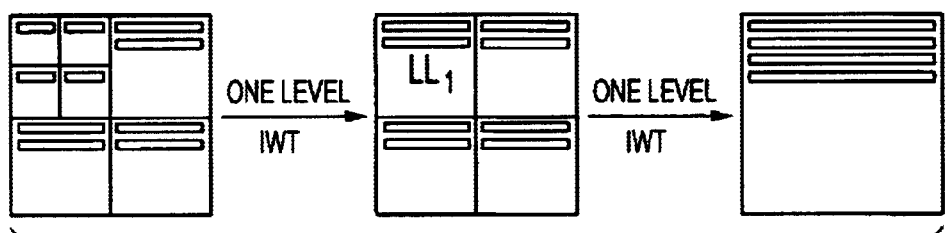
FIG. 3 is a diagrammatic view of the wavelet coefficients from a 2-level decomposition required to reconstruct the top row, with a 2-tap filter, when the coefficients are transmitted in zerotree structures.

As shown in FIG. 3, if two levels of decomposition are performed, the decoder's inverse transform operation can be analyzed in terms of one level of inverse wavelet tansform (IWT) at a time. The decoder performs one level of inverse wavelet transform (IWT) to reconstruct the top two rows of the $LL_1$ subband, using only a single line of coefficients from each of the four smallest subbands. Another round of IWT allows reconstruction of one more row of pixels.

In FIG. 2, one row from each of the four small subbands can be inverse transformed to obtain the first two rows of the low—low band of FIG. 1. With the coefficients depicted in FIG. 1, an inverse transform can be used to obtain the first row of the image (actually, the first two rows can be obtained). Consider, however, the zerotree dependencies. Each coefficient in the small bands has a block of 2×2 children in the outer bands. So, to transmit the coefficients in the form of a zerotree, information about all of the coefficients shown in FIG. 3 must be transmitted. Considering FIG. 3, because of the zerotree dependencies, the decoder receives extra coefficients that are not required in the inverse transform operation that yields the top row. The extra coefficients allow four rows to be reconstructed.

Figure 4:
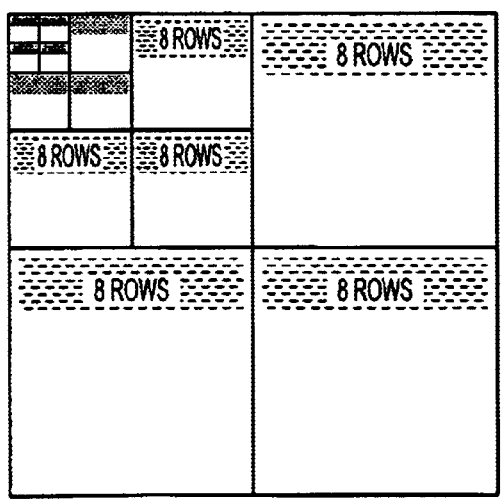
FIG. 4 is a diagrammatic view of the wavelet coefficients from a 4-level decomposition required to reconstruct the top row of an image with a 2-tap filter.

Using more levels of wavelet decomposition imposes a penalty factor. By adjusting the numbers of levels of decomposition, and the filter lengths, different amounts of required buffering at the decoder and different compression performance are obtained. For example, if a Haar wavelet filter of length 2 is used, with only 3 levels of decomposition (i.e., computing subbands of depth at most three), then there are exactly 512×8=4096 coefficients in the wavelet domain which contain all the information about the values of the first 8 rows of the image. These wavelet coefficients consist of 1 row in each of the 4 coarsest bands, 2 rows in each of the intermediate bands, and 4 rows in each of the finest detail bands. These 4096 coefficients can be inverse transformed by themselves to yield the first 8 rows of pixels in the original image. The entire set could be purged, and the decoder could buffer a 2nd strip of wavelet coeffcients, corresponding to a 2nd strip of pixels in the original image. To decompose 4 levels with the Haar filter, instead of 3, for example the decoder must buffer 16 rows at a time, rather than 8. In this manner, the description is exactly the same as before. This case is shown in FIG. 4, where the appropriate set of coefficients from the 4-level decomposition is indicated. These coefficients permit reconstruction of the first 16 rows of the image. Similarly, a 5-level decomposition leads to 32 rows of buffering, and a 6-level decomposition to 64 rows of buffering.

The goal of the compression for printers is to provide excellent distortion-rate performance with minimal decoder buffering. The performance of EZW and SPIHT with Haar filters and 3 or 4 levels of decomposition is very poor, however. The basic idea of EZW can be implemented with many different wavelet filters, and with different numbers of levels of decomposition. Better performance is often achieved with the Shapiro algorithm if longer filters and more levels of decomposition are used. This portion of the present invention, which reorders the output bitstream, yields a performance comparable to that of the EZW or SPIHT algorithms if the same filter lengths are used and the same number of levels of decomposition.

A direct tradeoff exists: as the number of levels of decomposition is increased, the distortion-rate performance improves, and the buffering requirement increases. This issue is discussed further in the next section.

4. Hybrid Filtering

The second portion of the present invention, which is called "hybrid filtering" is now described. This portion of the invention works in conjunction with the "line-by-line wavelet coding" described in sections 1–3 above.

The traditional wavelet/subband coding approach applies the same filtering in the horizontal and vertical directions. For example, the SPIHT algorithm uses 6 levels of decomposition with 9-7 bi-orthogonal filters in both the horizontal and vertical directions. For compression for printers however, large numbers of levels of decomposition in the vertical direction and long filter lengths in the vertical direction, cause increased memory requirements. The filtering in the horizontal direction also imposes a memory requirement, but this requirement is tolerated since an entire image row is printed at the same time.

The present invention introduces the notion of a "hybrid filter", which is a wavelet transform that uses either (i) different numbers of decomposition levels or (ii) different filter lengths, or (iii) both, in the different directions.

There have been filters described in the prior art literature before where one direction is not treated identically to another direction. These can be divided into three groups.

In a first group, filtering transpires in 3 dimensions, where two dimensions are spatial (x,y) coordinates and the third dimension is time (t), as occurs, for example, in video coding. The filtering in the two spatial directions is identical, but the time dimension uses a different filter. Reference Domanski, M.; Swierczynski, R. (Edited by: Mertzios, B. G.; Liatsis, P.) Efficient 3-D subband coding of colour video, Third International Workshop on Image and Signal Processing on the Theme of Advances in Computational Intelligence, Proceedings IWISPO '96, ISBN 0 444 82587 8, Manchester, UK, Nov. 4–7, 1996. Domanski, et al. present a simple and fast technique for video sequence coding at bit rates of about 150 kbps. Their technique is aimed at low-priced video applications. It consists of two basic elements: well-known 3D subband analysis and synthesis and a novel subband coding technique. For the inter-frame (temporal) subband analysis and synthesis the simple Haar wavelets are found to be good enough. On the other hand, for the intra-frame (spatial) analysis and synthesis, highly efficient recursive filter banks are used. The proposed subband coding technique uses the base subband (low—low-frequency) of the low-temporal subsequence in a simple detector of the scene moving areas. Information in other subbands is coded only in the areas related to significant movements. The most important feature of the technique is reported to be its simplicity; only approximately 1.5 seconds per input QCIF frame being needed on PC 486DX2 66 MHz machine using non-optimized software.

The present invention is different from any teaching or suggestion by Domanski, et al. of differential filtering between temporal (inter-frame) and spatial (intra-frame) dimensions in that the present invention concerns the use of different filters for the x and y spatial directions. The reasons recognized by Domanski, et al. for treating time (t) differently from space, and from the spatial coordinates (x,y), do not have obvious application to treating the individual spatial directions differently from each other.

In a second group, filtering transpires in 2 spatial dimensions, in which some feature is located in the image and its orientation is computed. The filtering then proceeds to operate differently along the orientation of the feature, and transverse to the orientation of the feature. For example, this occurs with noise reduction filters that are being used with edges. After the edge is located in the image, and its orientation is computed, a smoothing filter might be applied along the direction of the edge, but not transverse to the edge, so as not to blur the edge. The present invention is distinct from this in that different filters are employed in different fixed directions, that are not dependent on the features in the image. Furthermore, the reason for the filtering has to do with the memory requirements of the algorithm, and not with the effect on the features in the image, and to that extent the filtering of the present invention is even further removed from the prior art.

There is one paper in the literature which does describe the use of different filtering in different fixed spatial directions. See Zhigang Fan, Unscreening using a hybrid filtering approach, Proceedings International Conference on Image Processing, p. 351–4 vol. 3, 1996. The Fan paper presents a method for retrieving a gray picture from a halftone image. The algorithm performs a two dimensional (2-D) filtering which is composed of a 1-D lowpass filtering in one direction and a 1-D pattern matching in a perpendicular direction. The present invention differs from this in that linear filters (e.g., wavelet, subband or DCT filters) are employed for the purposes of image compression, as opposed to a pattern matching filter for inverse halftoning.

Accordingly, the concept of using different wavelet or subband or DCT filters in different fixed spatial directions is not known by the inventors to have been presented previously.

Consider an example that uses, in the horizontal direction, the full 6-levels of decomposition using the 9-7 filters. In the vertical direction, where the printer memory is affected, assume 3-levels of decomposition are used with the 9-7 filters, and 3 levels of filtering with the Haar filters of length 2. The total number of levels of decomposition in each direction is 6 in this example, but the buffering is much less than if the 9-7 filters were used fully on both directions.

The total number of levels of decomposition does not have to be the same in the two directions. For example, the same horizontal direction filters as above can be used, whereas the vertical direction could use 2-levels of decomposition with the 9-7 filters, and 3 levels of filtering with the Haar filters of length 2, for a total of only 5. There exist many different possibilities, each presenting its own trade-off of distortion-rate performance with buffering requirements.

A further generalization is to allow the transforms in the two directions to be of completely different types. For example, the horizontal transform might be a wavelet transform, whereas the vertical transform might be a block DCT. This would present still other possible trade-offs between distortion-rate performance and buffering requirements.

Figure 5:
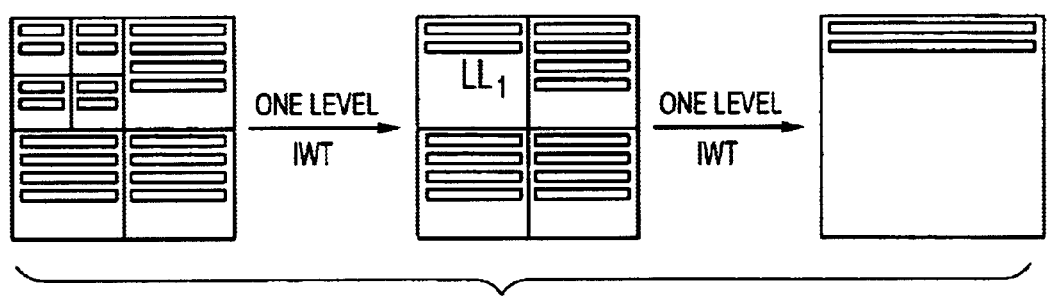
FIG. 5 is a diagrammatic view of the wavelet coefficients from a 2-level decomposition required to reconstruct the top row, with a 4-tap filter, when the coefficients are transmitted in zerotree structures.

For the 4-tap Daubechies filter, FIG. 5 is analogous to FIG. 3. FIG. 5 shows the minimal sets of coefficients needed by the decoder to reconstruct a single row in the image, using two levels of decomposition and zerotree quantization. At the first levels of decomposition two rows of coefficients are required for each of the 4 subbands (a total of 4×512= 2048 coefficients). The inverse wavelet transform operation on those coefficients alone allows reconstruction of the top row of the output image (512 pixels). To reconstruct the second row, no additional coefficients are needed, nor can we purge any of the coefficients from the first row. To reconstruct the third row, one line can be purged from each of the 4 subbands 1 and we need to receive a new line from the encoder from each of the 4 subbands. The memory usage thus remains constant. This forms a "sliding window" in which wavelet coefficients enter the window, are used for a few rounds of inverse filtering to reconstruct some rows, and then exit the window. This sliding window for wavelet coefficients is the main tool that we use in line-by-line wavelet encoding. With a two-level decomposition, as depicted in FIG. 5, we need 2 rows from each of the 4 small subbands, and therefore, because of the zerotree structure, 4 rows from each of the outer subbands. With these coefficients inverse transforming yields the first row of the image (actually, we would obtain the first two rows, but we are only concerned at this point with what is required to reconstruct one row, and the requirements are the same.)

Figure 6:
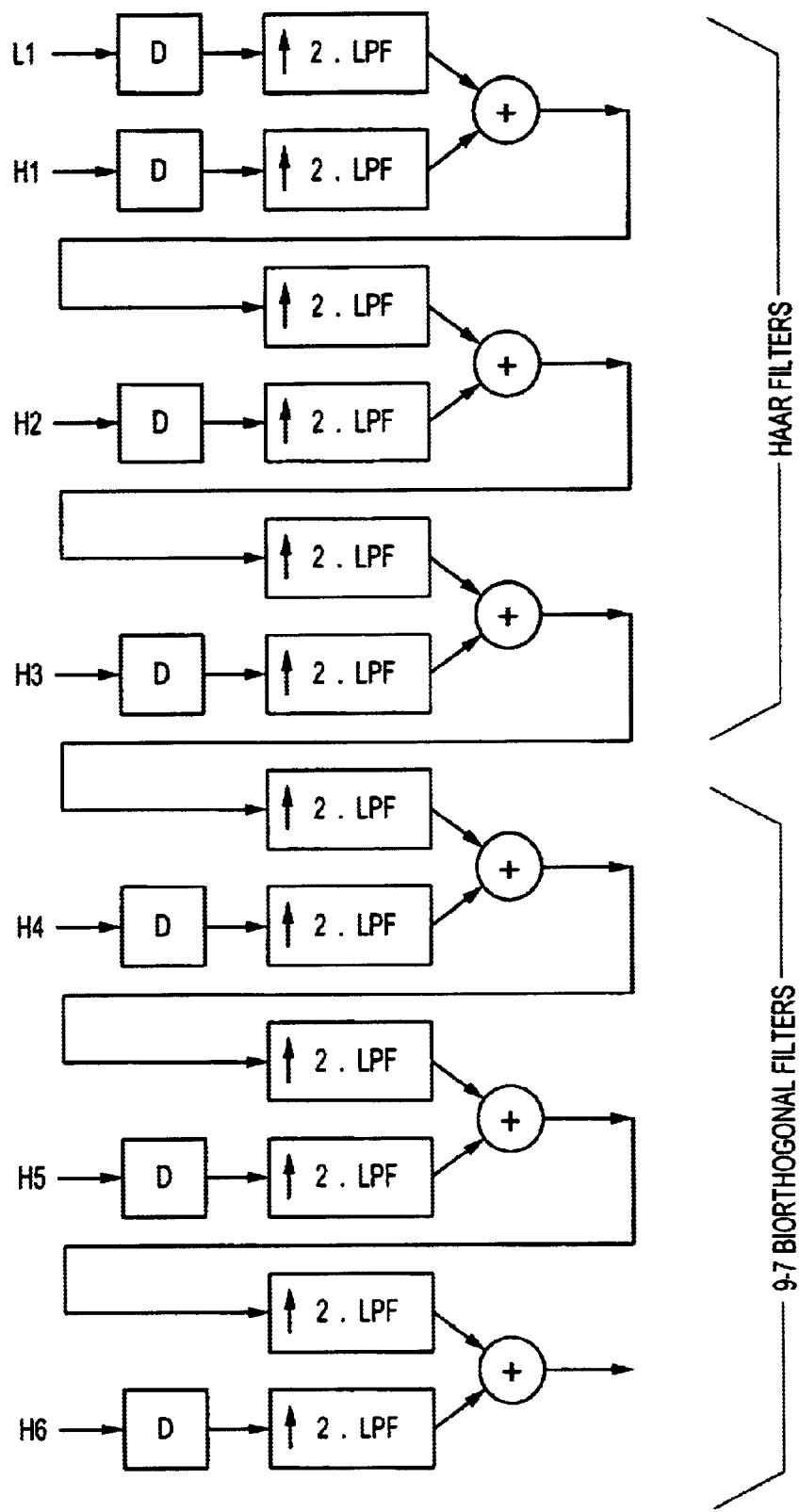
FIG. 6 is a block diagram of a hybrid filter wavelet decoder for the vertical direction.

FIG. 6 shows a block diagram of the decoding mechanism used with a hybrid filtering structure in the vertical direction. The Figure shows 6 levels of wavelet reconstruction. The first three levels are performed using Haar filters and the latter three levels use 9-7 biorthogonal filters. It is assumed that all 6 levels of decomposition in the horizontal direction use the 9-7 biorthogonal filters (which are not shown). In addition to the filters, delay elements are shown (labeled "D") preceding the high pass filters (and the first low pass filter).

Once the filters' memories are filled, to produce 64 new outputs (i.e., horizontal rows) at the end of the filter bank, one must provide 1 scalar input at the L1 and HI, 2 inputs at H2, 4 at H3, 8 at H4, 16 at H5, and 32 at H6. For some quantization schemes, only the memory of these filter banks is necessary to completely decode the image from the wavelet domain. For other types of quantization, namely zero-tree encoding, the delay elements shown in FIG. 6 must be used.

In EZW coding, information from different bit planes must be temporarily stored until entire wavelet coefficients can be deduced. Once wavelet coefficients are known, they can (in the proper order) be sent into the filters and propagated through the filter bank to produce output image values. The "D" boxes represent the process of accumulating bit plane information and delaying the input until wavelet coefficients are known (one by one). For EZW coding, for example, the total memory requirements are the sum of the filter memories and the sum of the delay memories. A substantial savings in memory over the usual full-image EZW decoding can still be achieved.

In general, the memory requirements can be divided into a portion required by the inverse filtering operations (to keep the filters' memories filled), and an additional portion required by the quantization scheme (depicted by the boxes labeled D). Memoryless scalar quantization (SQ) requires no extra storage, whereas predictive SQ and a context-based adaptive entropy coded SQ might require some extra coefficients to be stored and used for prediction or for context during reconstruction. Zerotree-based schemes also require extra storage beyond the amount required for the filters.

According to the previous discussion, differences from Shapiro's U.S. Pat. No. 5,315,670 may now be recognized. This patent specifically teaches that coefficients are evaluated "at successively finer thresholds for progressively refining the contents of said dominant and subordinate lists." The re-ordering scheme of the present invention does not follow this successive refinement. The image is not progressive.

Similarly, Shapiro's U.S. Pat. No. 5,563,960 teaches that "a bit of its bit budget is allocated to each and every wavelet coefficient having a value larger than a first given threshold value before a bit of its bit budget is allocated to any wavelet coefficient having a value which is not as large as said first given threshold . . . ." That is, coefficients are transmitted in the strict order imposed by the decreasing threshold. No information will be transmitted about the next threshold level until every single pixel is processed with respect to the previous, larger, threshold. In the method of the present invention this rule is BP intentionally violated: re-ordering does not follow this bit allocation concept. Instead, bits are allocated to smaller wavelet coefficients before some larger ones.

Similarly Shapiro's U.S. Pat. Nos. 5,321,776 and 5,412,741 concern that "coding means [should] include . . . means that starts with a list of coordinates of said LL subband of said array and a relatively high initial threshold value", etc. with successively lower threshold values. This is alien to the present invention.

The present invention may be understood to reorder the bitstream in the Shapiro algorithm to permit sequential processing of horizontal rows in the images (or groups of rows) with no loss, or but minor, loss in performance.

For those compression/decompression quantization algorithms that are not self-parsing, and where header information must be sent in order for the decoder to parse out the sequence of minimal sets that comprise the image, the present invention accords for sending a small amount of header information before each row, or before the entire image, in order to allow the decoder to correctly parse out the information being sent for each row. The most-preferred Teng and Neuhoff quantization algorithm is self-parsing, and requires no such header.

Finally, the present invention uses different numbers of levels of decomposition in the vertical and horizontal directions, and different filters in the vertical and horizontal directions, in order to reduce decoder memory requirements while providing good performance.

In accordance with the preceding explanation, variations and adaptations of image compression including "line-by-line wavelet coding" and "hybrid filtering" in accordance with the present invention will suggest themselves to a practitioner of the digital image processing arts.

In accordance with these and other possible variations and adaptations of the present invention, the scope of the invention should be determined in accordance with the following claims, only, and not solely in accordance with that embodiment within which the invention has been taught.

What is claimed is:

1. In a stepwise method of (i) wavelet-encoding an input image of finite horizontal and vertical extent into encoded data representative of the input image, (ii) communicating the wavelet-encoded image data to an image generator, (iii) decoding the wavelet-encoded image data in the image generator, and (iv) generating an output image from the decoded image data, the improvement which before the step of (i) wavelet-encoding further includes the step of filtering the image data with a mathematical filter applied in both horizontal and vertical spatial directions of the output image with a different number of levels of decomposition in each direction; and which between the steps of the (i) wavelet-encoding and the (ii) communicating further includes the step of re-ordering the wavelet-encoded image data so that the (ii) communicating is of successive portions of the wavelet-encoded image data representing successive strip portions of the input image, so that the (iii) decoding is of these successively communicated portions; and so that the (iv) output image generating is of successive portions of the output image in strips from one side to an opposite side of the output image;

wherein the (iii) decoding of the re-ordered image data portions, and the (iv) image generating of the portions of the output image associated therewith, is time-overlapped, certain strip portions of the output image being generated even before later image data portions as represent further strip portions of the output image are even communicated.

2. The improvement to the stepwise method of claim 1 wherein the re-ordering is so that the (ii) communicating is of wavelet-encoded image data representing successive strip portions of the input image taken vertically, from input image top to input image bottom; and the (iv) generating of the output image is of successive portions of the output image in strips from the output image top to the output image bottom.

3. The improvement to the stepwise method of claim 1 wherein the (i) wavelet-encoding is with the Teng and Neuhoff algorithm.

4. The improvement to the stepwise method of claim 1 wherein the (i) wavelet-encoding is with an embedded zerotree algorithm.

5. The improvement to the stepwise method of claim 4 wherein the (i) wavelet-encoding is with an embedded zerotree algorithm drawn from the class consisting of:

Embedded Zerotree Wavelet, EZW, coding; and

Set Partitioning in Hierarchical Trees, SPIHT encoding.

6. The improvement to the stepwise method of claim 5 wherein the re-ordering comprises:

rearranging the order of an EZW or a SPIHT bitstream that is an object of the communicating.

7. The improvement to the stepwise method of claim 1 wherein the re-ordering comprises:

line-by-line reordering of the wavelet coding, being a determining of each of (i) the first minimum set of wavelet coefficients that must be received by the generator in order to generate one single portion of the output image, (ii) a next minimum set of additional wavelet coefficients that must be communicated so that a next successive portion of the output image can be printed, and (2) how much of the current encoded data can be expunged from a memory within the image generator.

8. The improvement to the stepwise method of claim 1 wherein the re-ordering comprises:

a sliding window in the spatial domain of the wavelet-encoded output image, in which sliding windows (i) wavelet coefficients enter the window, (ii) are used for a few rounds of inverse filtering to permit the generating of a few successive vertical portions of the output image, and then (iii) exit the window.

9. In a stepwise method of (i) wavelet-encoding an input image of finite horizontal and vertical extent into encoded data representative of the input image, (ii) communicating the wavelet-encoded image data to an image generator, (iii) decoding the wavelet-encoded image data in the image generator, and (iv) generating an output image from the decoded image data, the improvement which before the step of (i) wavelet-encoding, further includes the steps of filtering the image data with a mathematical filter having a both a (1) different length and (2) a different number of levels of decomposition in each of the horizontal and vertical spatial directions; and which between the steps of the (i) wavelet-encoding and the (ii) communicating further includes the step of re-ordering the wavelet-encoded image data so that the (ii) communicating is of successive portions of the wavelet-encoded image data representing successive strip portions of the input image, so that the (iii) decoding is of these successively communicated portions; and so that the (iv) output image generating is of successive portions of the output image in strips from one side to an opposite side of the output image;

wherein the (iii) decoding of the re-ordered image data portions, and the (iv) image generating of the portions of the output image associated therewith, is time-overlapped, certain strip portions of the output image being generated even before later image data portions as represent further strip portions of the output image are even communicated.

* * * * *